United States Patent
Lee et al.

(10) Patent No.: US 8,868,734 B2
(45) Date of Patent: Oct. 21, 2014

(54) NETWORK AUDITING TOOL

(75) Inventors: Jae Seung Lee, Frisco, TX (US); Elaine Van Horn, Herndon, VA (US); Doug L. Wekamp, Colorado Springs, CO (US); Joseph Reiter, Richardson, TX (US); Charles W. Brown, Plano, TX (US); Firouzeh Rahimzadeh, Plano, TX (US); Neil A. Rogers, Carrollton, TX (US); Joseph A. McLaughlin, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 298 days.

(21) Appl. No.: 13/348,258

(22) Filed: Jan. 11, 2012

(65) Prior Publication Data

US 2013/0179562 A1 Jul. 11, 2013

(51) Int. Cl.
*G06F 15/16* (2006.01)
*G06F 15/173* (2006.01)

(52) U.S. Cl.
USPC ............................. 709/224; 370/241; 370/392

(58) Field of Classification Search
USPC .......................................................... 709/224
See application file for complete search history.

(56) References Cited

U.S. PATENT DOCUMENTS

| 5,781,535 | A | * | 7/1998 | Russ et al. ..................... 370/248 |
| 5,809,286 | A | * | 9/1998 | McLain et al. .................. 703/23 |
| 5,920,257 | A | * | 7/1999 | Commerford ................ 340/506 |
| 6,134,671 | A | * | 10/2000 | Commerford et al. ......... 714/4.3 |
| 6,356,546 | B1 | * | 3/2002 | Beshai .......................... 370/358 |
| 6,580,721 | B1 | * | 6/2003 | Beshai .......................... 370/428 |
| 6,747,988 | B1 | * | 6/2004 | Jordan et al. .................. 370/466 |
| 7,519,003 | B2 | * | 4/2009 | Koziy et al. .................... 370/248 |
| 8,095,722 | B1 | * | 1/2012 | Liao et al. ..................... 710/317 |
| 2002/0080790 | A1 | * | 6/2002 | Beshai .......................... 370/392 |
| 2003/0165160 | A1 | * | 9/2003 | Minami et al. ................ 370/466 |
| 2003/0189947 | A1 | * | 10/2003 | Beshai .......................... 370/428 |
| 2004/0062267 | A1 | * | 4/2004 | Minami et al. ................ 370/463 |
| 2004/0156610 | A1 | * | 8/2004 | Charlton et al. ............... 385/129 |
| 2005/0063400 | A1 | * | 3/2005 | Lum ............................. 370/401 |
| 2007/0047436 | A1 | * | 3/2007 | Arai et al. ..................... 370/219 |
| 2007/0253430 | A1 | * | 11/2007 | Minami et al. ........... 370/395.52 |
| 2008/0285555 | A1 | * | 11/2008 | Ogasahara ..................... 370/389 |
| 2012/0236750 | A1 | * | 9/2012 | Bugenhagen et al. ........ 370/252 |

* cited by examiner

*Primary Examiner* — Tauqir Hussain

(57) ABSTRACT

A method, performed by a computer device, may include scanning a network of digital cross connect devices to identify an open port and determining that the identified open port has been designated as unavailable in a provisioning database. The method may further include determining that the identified open port corresponds to a recoverable port and recovering the identified open port by designating the identified open port as available in the provisioning database, in response to determining that the identified open port corresponds to a recoverable port.

18 Claims, 12 Drawing Sheets

NETWORK AUDITING TOOL

BACKGROUND INFORMATION

A provider of telecommunication services may manage circuits for clients in a circuit-switched network. A circuit may enable remote client devices to communicate across a network using a dedicated communication channel and may function as if the client devices were physically connected. The circuit may be established across a network using multiple digital cross connect devices. A digital cross connect device may allow lower level bit streams to be interconnected among higher level bit streams to create circuit connections in a circuit-switched network. A circuit-switched network may include a large number of digital cross connect. devices and each digital cross connect device may include a large number of ports. Therefore, managing a circuit-switched network may be a difficult task.

DETAILED DESCRIPTION OF PREFERRED EMBODIMENTS

Figure 1:
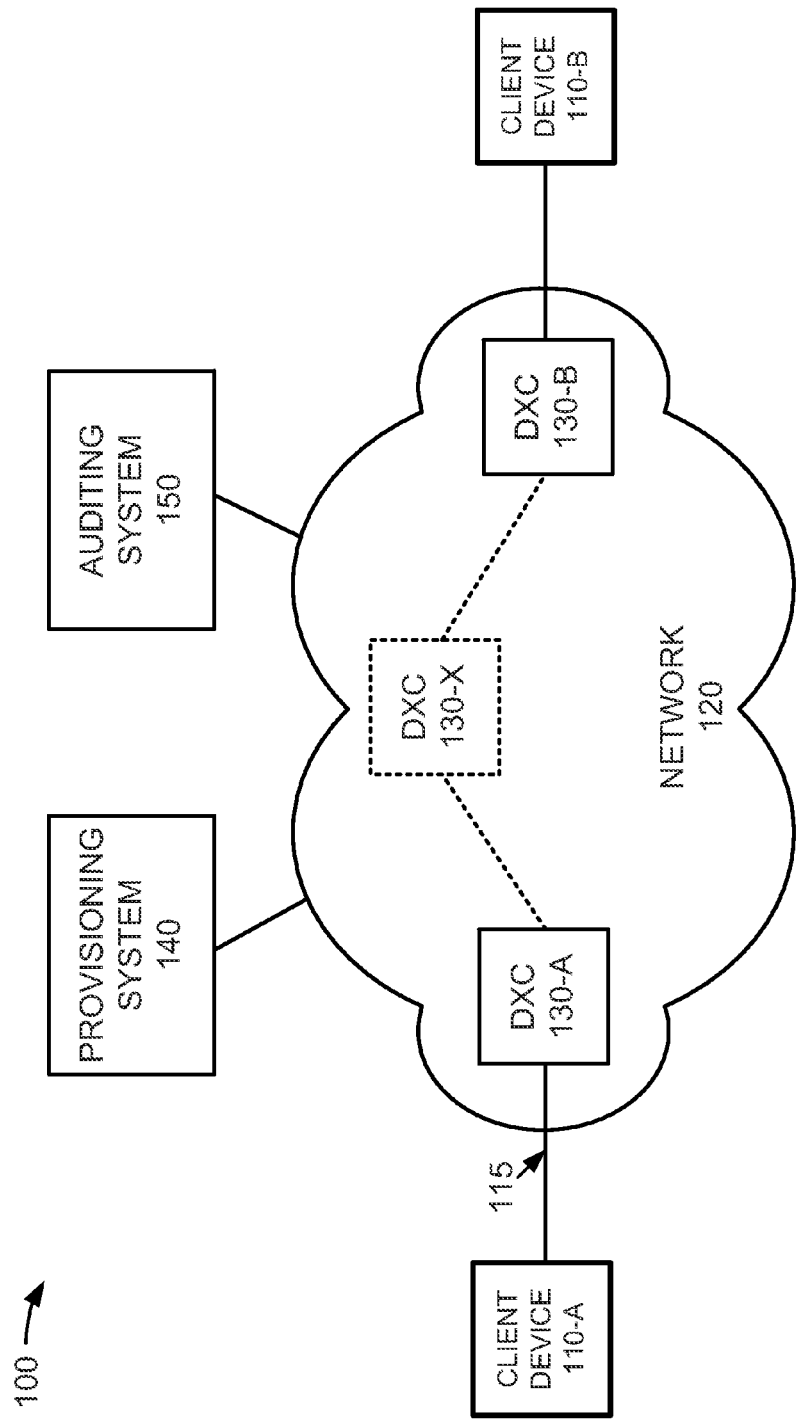
FIG. 1 is a diagram illustrating an exemplary environment according to an implementation described herein.

The following detailed description refers to the accompanying drawings. The same reference numbers in different drawings identify the same or similar elements.

A circuit-switched network may be associated with a provisioning database that stores information about which ports in the network are available and which ports have been provisioned for a circuit. However, the provisioning database may not accurately reflect which ports are available.

An implementation described herein may relate to an auditing system that scans a circuit-switched network for open ports. An open port may correspond to a port that is not part of a functioning circuit. Identified open ports may be stored in a scanning database. An auditing tool may compare the scanning database to the provisioning database to identify ports that are open yet indicated as unavailable in the provisioning database. The auditing tool may determine whether there is a legitimate reason for an open port the indicated as unavailable. For example, an open port may have been reserved for a future circuit or may have been temporarily opened because a hold has been placed on a circuit (e.g., due to an unpaid balance). If a legitimate reason for the unavailability of the port is not identified, the open port may be designated as a recoverable port and marked for recovery. A recoverable port may be recovered by a provisioning system by designating the port as available in the provisioning database. Furthermore, if the recovered port is associated with a particular circuit, other ports associated with the circuit may be identified as recoverable ports and recovered as well.

Furthermore, an implementation described herein may relate to using a recovered port in connection with an optimization tool. An optimization tool may identify a circuit that may be optimized by reducing the length of the circuit using any available ports, including recovered ports, by, for example, reducing the number of ports associated with the circuit. The auditing tool may provide information about a recovered port to the optimization tool via a shared scanning database and the optimization tool may respond by determining whether any existing circuits could be optimized using the recovered port. If the optimization tool determines that an existing circuit could be optimized using the recovered port, the optimization tool may re-route the existing circuit through the recovered port. Thus, the optimization tool may experience a higher success rate at a first attempt at optimization by being able to access the scanning database rather than having to only rely on the provisioning database.

Moreover, an implementation described herein may relate to using a recovered port in connection with a grooming tool. A grooming tool may process circuits by grouping smaller circuits into larger units in order to reduce cost using any available ports, including recovered ports, such as by combining multiple digital signal 0 (DS0) circuits onto a common DS1 circuit. The auditing toot may provide information about a recovered port to the grooming tool via a shared scanning database and the grooming tool may respond by determining whether any existing circuits could be groomed by re-routing the circuits through the recovered port. For example, the grooming tool may re-route two DS0 circuits through a recovered DS1 port. Thus, the grooming tool may experience a higher success rate at a first attempt at grooming by being able to access the scanning database rather than having to only rely on the provisioning database.

FIG. 1 is a diagram of an exemplary environment 100 in which the systems and/or methods described herein may be implemented. As shown in FIG. 1, environment 100 may include client devices 110-A and 110-B (referred to herein collectively as "client devices 110" and individually as "client device 110"), a network 120, a provisioning system 140, and an auditing system 150.

Client device 110 may include any device with a communication function, such as, for example, a personal computer or workstation; a server device; a portable computer; a printer, fax machine, or another type of physical medium output device; a television, a projector, a speaker, or another type of a display or audio output device; a set-top box; a gaming system; a camera, a video camera, a microphone, a sensor, or another type of input or content recording device; a portable communication device (e.g. a mobile phone, a smart phone, a tablet computer, a global positioning system (GPS) device, and/or another type of wireless device); a voice over Internet Protocol (VoIP) telephone device; a radiotelephone; a gateway, a router, a switch, a firewall, a network interface card (NIC), a hub, a bridge, a proxy server, or another type of firewall device; a line terminating device, such as an add-drop multiplexer or an optical network terminal; a cable modem; a cable modem termination system; and/or any type of device with communication capability.

Client device 110-A may be connected to client device 110-B via a circuit 115 across network 120. Circuit 115 may correspond to a dedicated physical connection between client device 110-A and client device 110-B. In one example, circuit 115 may include a digital signal (DS) 0 connection, a DS1 connection, a DS3 connection, and/or another type of connection via copper wires, coaxial cables, or fiber-optic cables. In another example, circuit 115 may include an optical connection.

Network 120 may include one or more circuit-switched networks and/or packet-switched networks. For example, network 120 may include a circuit-switched network that includes one or more digital cross connect devices (DXC) 130 (referred to herein collectively as "DXCs 130" and individually as "DXC 130"). DXC 130 may digitally switch a physical tine connected to an input port of DXC 130 to a physical line connected to an output port of DXC 130. DXC 130 may include a wide baud digital cross connect, a narrow band digital cross connect, and/or another type of digital cross connect. Circuit 115 may be connected through one or more DXC 130. For example, in FIG. 1, circuit 115 includes a connection from client device 110-A to DXC 130-A, a connection from DXC 130-A to DXC 130-X, a connection from DXC 130-X to DXC 130-B, and a connection from DXC 130-B to client device 110-B. While in FIG. 1, circuit 115 is illustrated as being connected via three DXCs 130, circuit 115 may include a different number of DXCs 130 (indicated by the dashed lines between DXC 130-A and DXC 130-B).

Additionally, or alternatively, network 150 may include a local area network (LAN), a wide area network (WAN), a metropolitan area network (MAN), an ad hoc network, an intranet, a fiber optic-based network, a wireless network, and/or a combination of these or other types of networks. For example, network 120 may include a packet-switched network that enables DXC 130, provisioning system 140, and/or auditing system 150 to communicate with each other.

Provisioning system 140 may include one or more devices, such as server devices and/or storage devices, which provision circuits in network 120. For example, provisioning system 140 may establish (or disconnect) circuit 115 by instructing DXCs 130 to make particular connections, may store an indication in a provisioning database that a port has become unavailable, may store an indication in the provisioning database that a port has become available again, and/or may perform another provisioning function.

Auditing system 150 may include one or more devices, such as server devices and/or storage devices, which may perform an audit of ports in network 120. For example, auditing system 150 may scan network 120 to identify open ports (e.g., ports that are not part of an active circuit) and store information about identified open ports in an auditing database. Auditing system 150 may identify recoverable ports by comparing information about the identified open ports with information about unavailable ports stored in the provisioning database. Open ports that have been indicated as unavailable may be identified as recoverable ports. Auditing system 150 may instruct provisioning system 140 to recover an open port by updating the provisioning database to indicate that the open port is available.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
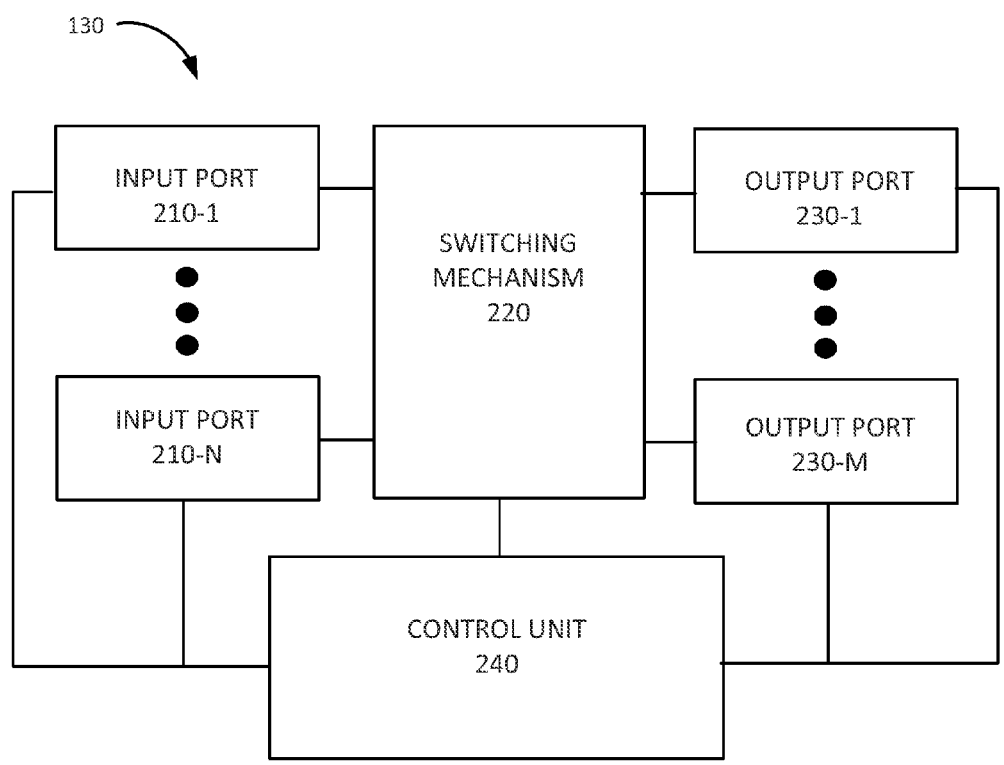
FIG. 2 is a diagram illustrating exemplary components of a digital cross connect device of FIG. 1.

FIG. 2 is a diagram illustrating example components of DXC 130 of FIG. 1. As shown in FIG. 2, DXC 130 may include one or more input ports 210-1 to 210-N (referred to herein individually as "input port 210" and collectively as "input ports 210"), a switching mechanism 220, one or more output ports 230-1 to 230-N (referred to herein individually as "output port 230" and collectively as "output ports 230"), and/or a control unit 240.

Input ports 210 may be the points of attachments for physical links and may be the points of entry for incoming traffic. In one implementation, input port 210 may be connected to an electrical cable capable of carrying a DS1 signal (or up to 24 DS0 signals), a DS3 (that may carry up to 28 DS1 signals), and/or any other type of cable. In another implementation, input port 210 may be connected to an optical cable.

Switching mechanism 220 may include one or more switching planes and/or fabric cards to facilitate communication between input ports 210 and output ports 230. In one implementation, each of the switching planes and/or fabric cards may include a single or multi-stage switch of crossbar elements. In another implementation, each of the switching planes may include some other form(s) of switching elements. Additionally or alternatively, switching mechanism 220 may include one or more processors, one or more memories, and/or one or more paths that permit communication between input ports 210 and output ports 230.

Output ports 230 may be the points of attachments for physical links and may be the points of exit for outgoing traffic. In one implementation, output port 230 may be connected to an electrical cable capable of carrying a DS1 signal (or up to 24 DS0 signals), a DS3 signal (that may carry up to 28 DS1 signals), and/or any other type of cable. In another implementation, output port 230 may be connected to an optical cable.

Control unit 240 may control the operation of switching mechanism 220. For example, control unit 240 may configure switching mechanism 220 to connect a particular input port 210 to a particular output port 230 to route a circuit from input port 210 to output port 230.

Although FIG. 2 shows example components of DXC 130, in other implementations, DXC 130 may include fewer components, different components, differently arranged components, and/or additional components than depicted in FIG. 2. Additionally or alternatively, one or more components of DXC 130 may perform one or more tasks described as being performed by one or more other components of DXC 130.

Figure 3:
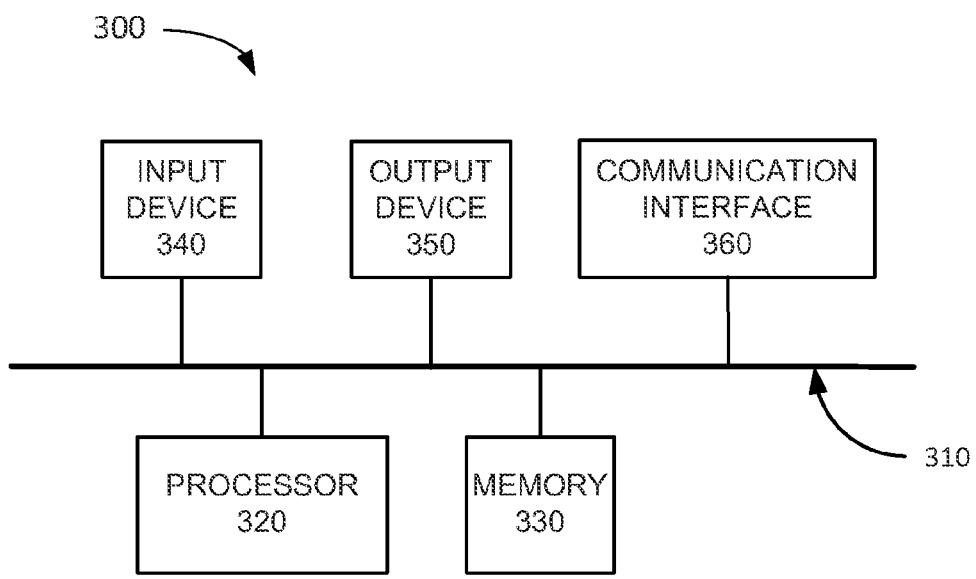
FIG. 3 is a diagram illustrating exemplary components of a device that may be included in one or more components of FIG. 1.

FIG. 3 is a diagram illustrating exemplary components of a device 300 according to an implementation described herein. Provisioning system 140, auditing system 150, client device 110, and/or control unit 240 of DXC 130 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying information. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RE) signals and/or a receiver that converts RF signals to baseband signals. Communication interface 360 may be coupled to an antenna for transmitting and receiving RE signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to scanning, auditing, and/or recovering ports in a circuit-switched network and/or to optimizing and/or grooming circuits. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4:
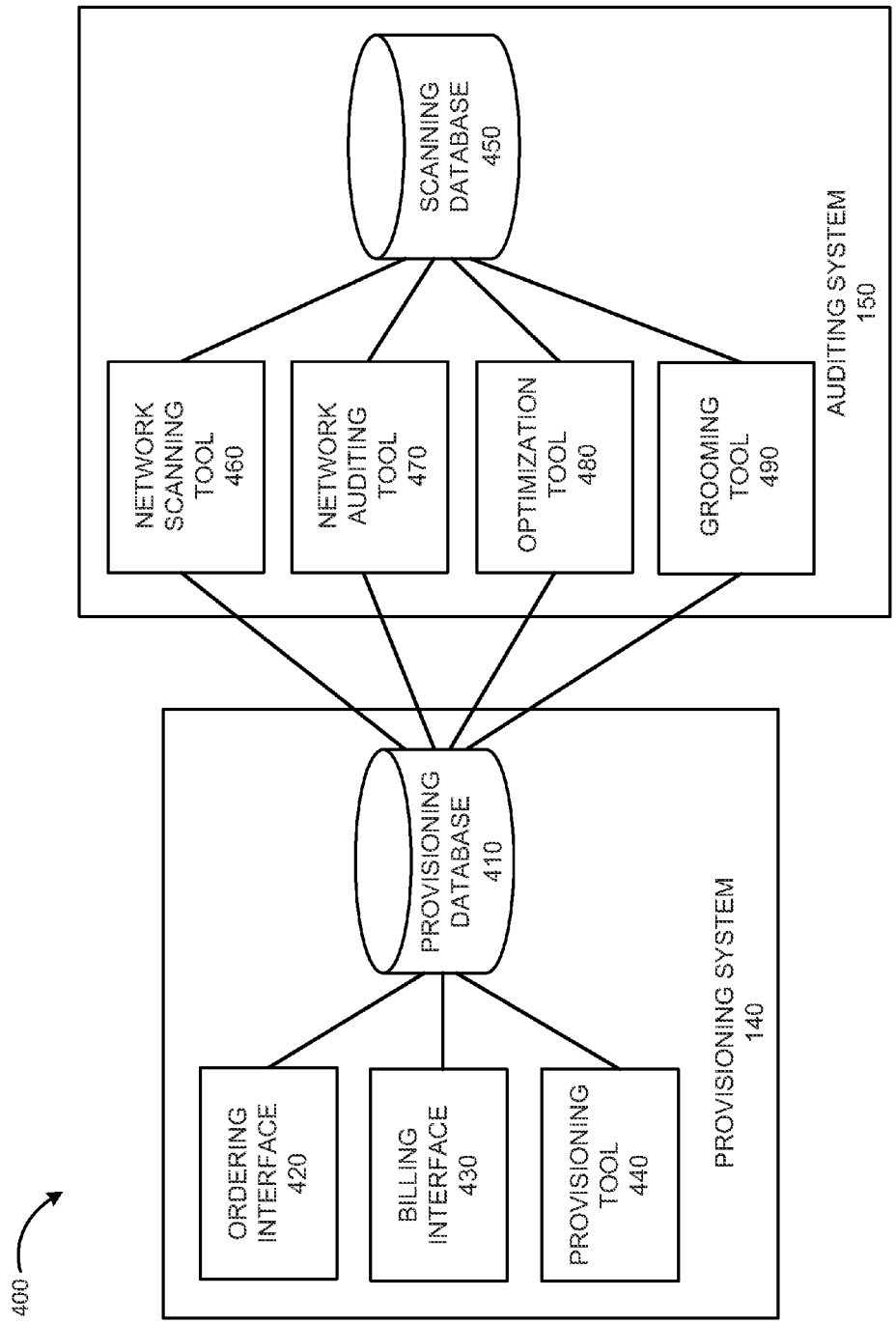
FIG. 4 is a diagram illustrating exemplary functional components of the provisioning system and the auditing system of FIG. 1.

FIG. 4 is a diagram of exemplary functional components of provisioning system 140 and auditing system 150. The functional components of provisioning system 140 and/or auditing system 150 may be implemented, for example, via processor 320 executing instructions from memory 230. As shown in FIG. 4, provisioning system 140 may include a provisioning database 410, an ordering interface 420, a billing interface 430, and a provisioning tool 440.

Provisioning database 410 may store information about which ports of network 120 (e.g., ports associated with DXCs 130) have been provisioned and are therefore unavailable and which ports are available. Exemplary components of provisioning database 410 are described below with reference to FIG. 5.

Ordering interface 420 may interact with an ordering system. The ordering system may receive an order from a customer for a circuit or may receive a disconnect order from a customer to disconnect a circuit. Ordering interface 420 may provide information to the ordering system about available ports and/or may store information in provisioning database 410 about a circuit that has been ordered or that is associated with a disconnect order and may provide the information to provisioning tool 440.

Billing interface 430 may interact with a billing system. The billing system may manage an account associated with a customer, may generate bills associated with the account, and/or may receive payments in response to the generated bills. If the account is associated with an unpaid balance, or if the unpaid balance exceeds a particular amount or has been unpaid for a particular length of time, the billing system may send an instruction to billing interface 430 to deactivate a circuit associated with the customer. Billing interface 430 may store information in provisioning database 410 about the instruction to deactivate the circuit and may provide the information to provisioning tool 440.

Provisioning tool 440 may manage provisioning of ports and/or circuits in network 120. For example, provisioning tool 440 may activate a particular port, may instruct DXC 130 to connect a particular input port 210 to a particular output port 230 to route a circuit, may deactivate a particular port, and/or may instruct DXC 130 to disconnect a particular input port 210 from a particular output port 230. Furthermore, provisioning tool 440 may update provisioning database 410 to indicate whether a port is available or unavailable. Moreover, provisioning tool 440 may recover a port, in response to receiving an indication from auditing system 150 that a port should be recovered, by updating provisioning database 410 to indicate that the recovered port is available.

Auditing system 150 may include a scanning database 450, a network scanning tool 460, a network auditing tool 470, an optimization tool 480, and a grooming tool 490. Scanning database 450 may store the results of a scan of network 120 to indicate which ports are open (e.g., which ports are not part of an active circuit). Network scanning tool 460 may scan network 120 to identify open ports. For example, network scanning tool 460 may include a T1 interface, which may query ports associated with a particular DXC 130 to determine the status associated with the ports.

Network auditing tool 470 may, periodically (e.g., once a day) and/or automatically, perform an audit of network 120 to determine recoverable ports. For example, network auditing tool 470 may compare the contents of scanning database 450 with the contents of provisioning database 410 to identify recoverable ports by identifying open ports, as indicated in auditing database 450, which are indicated as unavailable in provisioning database 410. Network auditing tool 470 may provide information about recoverable ports to provisioning tool 440. Moreover, network auditing tool 470 may make available information about recoverable ports to optimization tool 480 and/or to grooming tool 490 by including the information in scanning database 450.

Optimization tool 480 may optimize a circuit using any available ports, including recovered ports. For example, optimization tool 480 may access scanning database 450 during an optimization process, may determine that a port has been recovered by comparing information stored in scanning database 450 with information stored in provisioning database 410, may determine that the length of a circuit could be reduced by re-routing the circuit through the recovered port, and may optimize the circuit by re-routing the circuit through the recovered port. Thus, optimization tool 480 may experience a higher success rate at optimizing a particular circuit by having access to scanning database 450.

Grooming tool 490 may groom one or more circuits using any available ports, including recovered ports. For example, grooming tool 490 may access scanning database 450 during an optimization process, may determine that a port has been recovered by comparing information stored in scanning database 450 with information stored in provisioning database 410, may determine that one or more circuits may be groomed by re-routing the circuit through the recovered port, and may groom the one or more circuits by re-routing the one or more circuits through the recovered port. Thus, grooming tool 490 may experience a higher success rate at optimizing a particular circuit by having access to scanning database 450.

Although FIG. 4 shows exemplary functional components of provisioning system 140 and auditing system 150, in other implementations, provisioning system 140 and/or auditing system 150 may include fewer functional components, different functional components, differently arranged functional components, or additional functional components than depicted in FIG. 4. Additionally or alternatively, one or more functional components of provisioning system 140 and/or auditing system 150 may perform functions described as being performed by one or more other functional components of provisioning system 140 and/or auditing system 150. As an example, in another implementation, optimization tool 480 may be part of an optimization system separate from, and/or possibly remote from, auditing system 150. As another example, grooming tool 490 may part of a grooming system separate from, and/or possibly remote from, auditing system 150. For example, control unit 240 of a particular DXC 130 may include a grooming tool.

Figure 5:
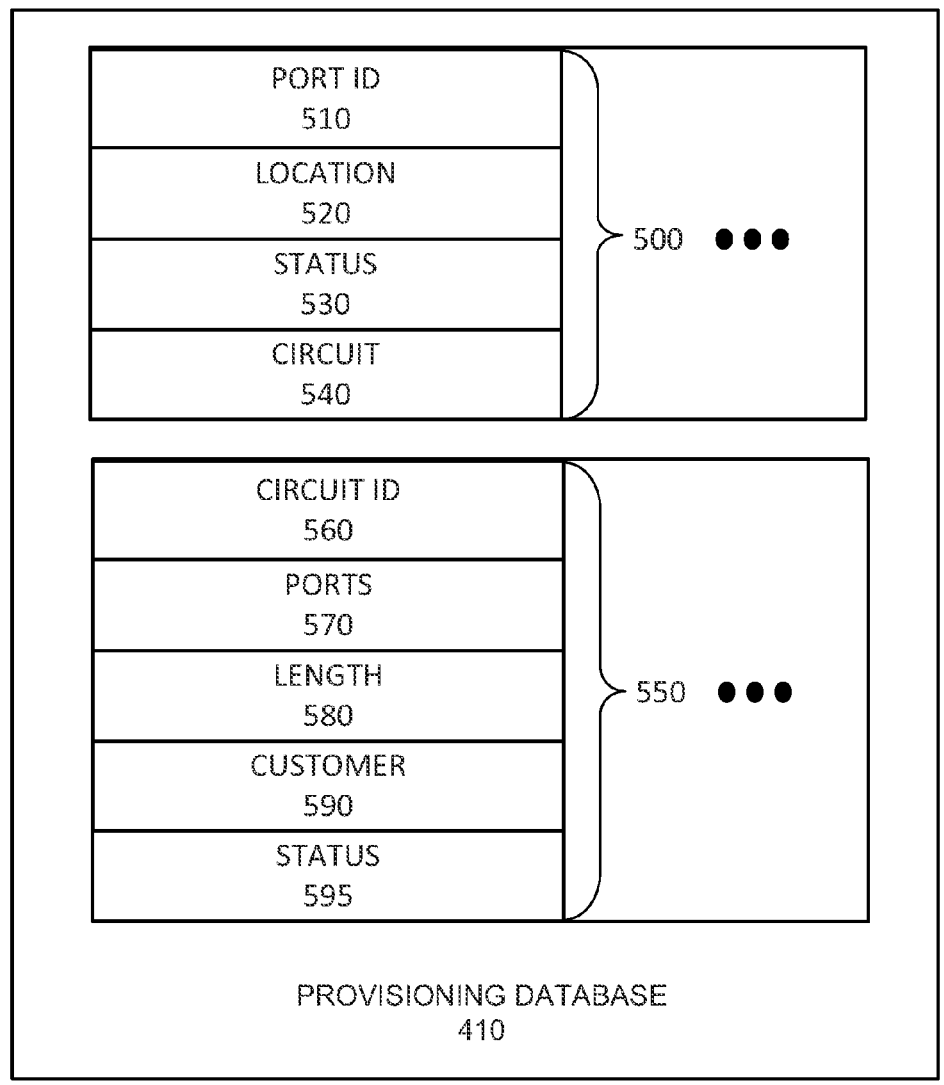
FIG. 5 is a diagram of exemplary components that may be stored in the provisioning database of FIG. 4.

FIG. 5 is a diagram illustrating exemplary components that may be stored in provisioning database 410. As shown in FIG. 5, provisioning database 410 may include one or more local port records 500 (referred to herein collectively as "port records 500" and individually as "port record 500") and one or more circuit records 550 (referred to herein collectively as "circuit records 550" and individually as "circuit record 550").

Each port record 500 may be associated with a particular port. Port record 500 may include a port identifier (ID) field 510, a location field 520, a status field 530, and a circuit field 540. Port ID field 510 may include an identifier that uniquely identifies a particular port. Location field 520 may store information about a location associated with the particular port. The location information may be stored in any applicable format, such as Global Positioning System (GPS) coordinates.

Status field 530 may store a status associated with the particular port. For example, status field 530 may include information about whether the particular port is available or whether the particular port is not available. Furthermore, status field 530 may store information about why the particular port is unavailable. As an example, status field 530 may indicate that the particular port is reserved, along with information indicating when the port was reserved, information indicating when the reservation expires, and/or information indicating a particular condition that may cause the reservation to expire.

Circuit field 540 may store information identifying a particular circuit with which the particular port is associated. For example, circuit field 540 may store a circuit identifier. Additionally or alternatively, circuit field 540 may store information identifying other ports associated with the particular circuit.

Each circuit record 550 may be associated with a particular circuit. Circuit record 550 may include a circuit ID field 560, a ports field 570, a length field 580, a customer field 590, and a status field 595. Circuit ID field 560 may include an identifier that uniquely identifies a particular circuit. Ports field 570 may include information identifying ports associated with the particular circuit.

Length field 580 may store length information associated with the particular circuit. For example, length field 580 may store information about a physical distance from one end of the particular circuit to the other end of the particular circuit (e.g., a physical distance from a first city to a second city associated with the circuit). Additionally or alternatively, length field 580 may store information about an actual length of the particular circuit based on distances between ports associated with the particular circuit. The actual length of the particular circuit may be determined by adding up the distances between each of DXCs 130 through which the particular circuit is routed.

Furthermore, length field 580 may include an optimization flag that, when set, tags the particular circuit for optimization. For example, the optimization flag may be set when a ratio, of an actual length of the circuit to a physical distance length of the circuit, exceeds a threshold amount. As an example, if a circuit connects a client device 110 in San Francisco to a client device 110 in Los Angeles, the physical distance may corresponds to a distance from San Francisco to Los Angeles (about 350 miles). Assuming a threshold of 1.5, if the actual length of the circuit is longer than 525 miles (i.e., 350 times 1.5), the optimization flag may be set to tag the circuit for optimization. An optimization process may aim to reduce the actual length of the circuit.

Customer field 590 may store information identifying a particular customer associated with the particular circuit. Status field 595 may store information about a status associated with the particular circuit. For example, status field 595 may indicate whether the circuit is activated or not activated along with a reason explaining the status associated with the particular circuit. As an example, status field 595 may indicate that a circuit has been temporarily deactivated because of an unpaid balance associated with the particular customer. As another example, status field 595 may indicate that a circuit has been deactivated because a disconnect order has been received for the particular circuit.

Although FIG. 5 shows exemplary components of provisioning database 410, in other implementations, provisioning database 410 may include fewer components, different components, differently arranged components, or additional components than depicted in FIG. 5.

Figure 6:
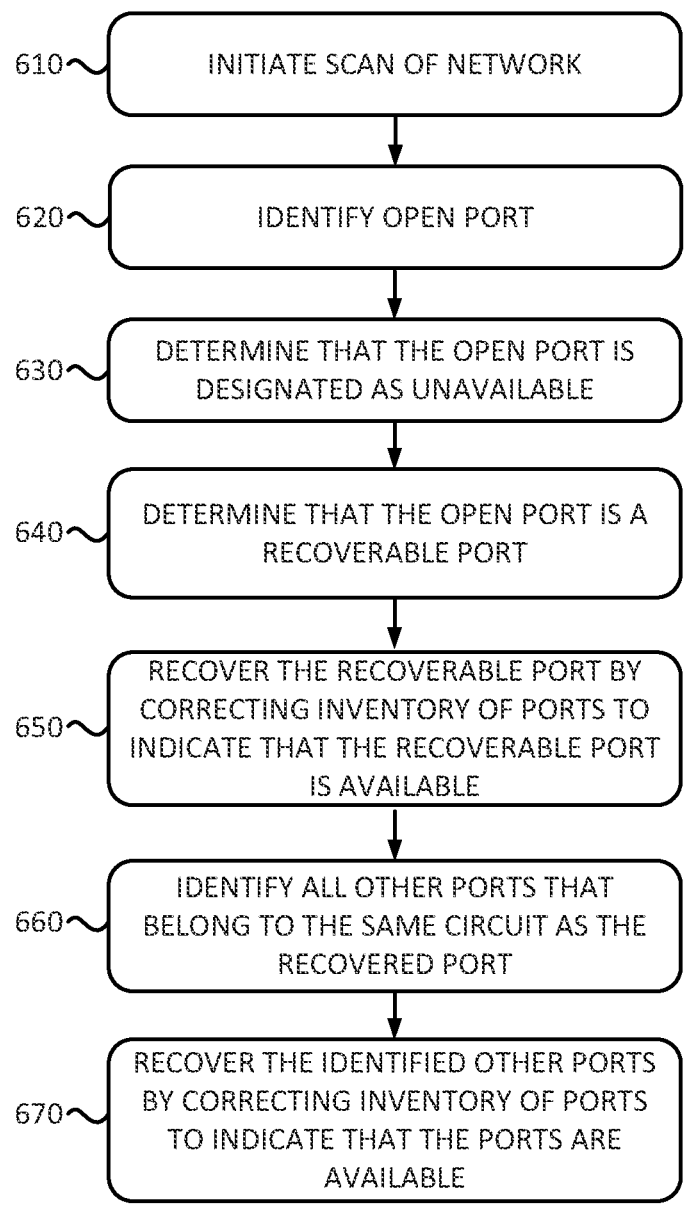
FIG. 6 is a flow chart of an exemplary process for recovering a recoverable port according to an implementation described herein.

FIG. 6 is a flow chart of an exemplary process for recovering a recoverable port according to an implementation described herein. In one implementation, the process of FIG. 6 may be performed by auditing system 150. In other implementations, some or all of the process of FIG. 6 may be performed by another device or a group of devices separate from auditing system 150 and/or including auditing system 150.

The process of FIG. 6 may include initiating a scan of a network (block 610). For example, network scanning tool 460 may scan network 120, or a subset of network 120, to identify open ports. Network scanning tool 460 may include a T1 interface (or another type of port interface) that network scanning tool 460 may use to query a port of DXC 130 to determine a status of the port.

An open port may be identified (block 620). For example, network scanning tool 460 may determine, in response to querying the status of a particular port, that the particular port is open (e.g., not being used) and may store an indication in scanning database 450 that the particular port is open. A determination may be made that the open port is designated as provisioned (block 630). For example, network auditing toot 470 may access provisioning database 410, identify a port record 500 associated with the identified open port, and determine that the identified open port is associated with an unavailable status.

A determination may be made that the open port is a recoverable port (block 640). For example, network auditing tool 470 may determine whether there is a valid reason for why the open port is designated as unavailable. A process for determining whether the open port is a recoverable port is described below with reference to FIG. 7.

The recoverable port may be recovered by correcting the inventory of ports to indicate that the recoverable port is available (block 650). For example, network auditing tool 470 may instruct provisioning tool 440 to update provisioning database 410 to indicate that the port is available. All other ports that belong to the same circuit as the recovered port may be identified (block 660). For example, network auditing tool 470 may access circuit field 540 of port record 500, associated with the recovered port, to identify a particular circuit associated with the recovered port. Network auditing tool 470 may access circuit record 550, associated with the particular circuit, to identify other ports associated with the particular circuit. If the identified open port is determined to be recoverable, the particular circuit may not be an active and/or valid circuit, and any other ports associated with the particular circuit may be recoverable as well.

The identified other ports may be recovered by correcting the inventory of ports to indicate that the ports are available (block 670). For example, network auditing tool 470 may instruct provisioning tool 440 to update provisioning database 410 to indicate that the identified other ports are available.

Figure 7:
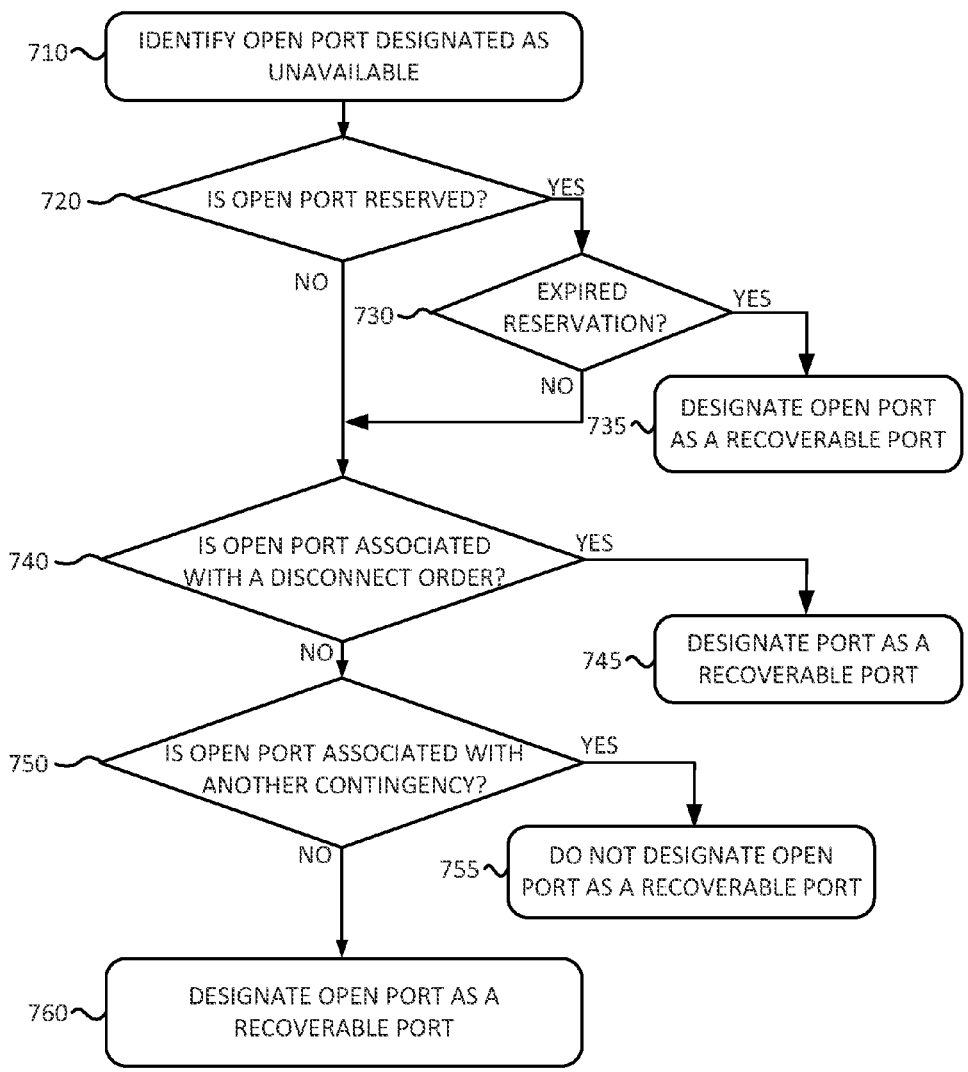
FIG. 7 is a flow chart of an exemplary process for determining whether to designate an open port as a recoverable port according to an implementation described herein.

FIG. 7 is a flow chart of an exemplary process for determining whether to designate an open port as a recoverable port according to an implementation described herein. In one implementation, the process of FIG. 7 may be performed by auditing system 150 and/or provisioning system 140. In other implementations, some or all of the process of FIG. 7 may be performed by another device or a group of devices separate from auditing system 150 and/or provisioning system 140, and/or including auditing system 150 and/or provisioning system 140.

The process of FIG. 7 may include identifying an open port designated as unavailable (block 710). For example, network auditing tool 470 may compare the information stored in scanning database 450 with the information stored in provisioning database 410 to identify an open port that is indicated as being unavailable in provisioning database 410.

A determination may be made as to whether the open port is reserved (block 720). For example, in one implementation, network auditing tool 470 may access status field 530 of port record 500 associated with the identified open you to determine whether the open port is associated with a reserved status. In another implementation, network auditing toot 470 may obtain information about whether the open port is associated with a reserved status using another technique, such as, for example, by contacting an ordering system.

If it is determined that the open port is reserved (block 720—YES), a determination may be made as to whether the reservation has expired (block 730). For example, network auditing tool 470 may access status field 530 associated with the particular port to determine whether the reserved status has expired. If it is determined that the reservation has expired (block 730—YES), the open port may be designated as a recoverable port (block 735). For example, network auditing tool 470 may determine that the open port is recoverable and may instruct provisioning tool 440 to update provisioning database 410 to indicate that the open port is available. If it is determined that the reservation has not expired (block 730—NO), processing continue to block 740.

Returning to block 720, if it is determined that the open port is not reserved (block 720—NO), a determination may be made as to whether the open port is associated with a disconnect order (block 740). For example, in one implementation, network auditing tool 470 may access status field 530 of port record 500 associated with the identified open port to determine whether the open port is associated with a disconnect order. In another implementation, network auditing tool 470 may obtain information about whether the open port is associated with a disconnect order using another technique, such as, for example, by contacting an ordering system.

If it is determined that the open port is associated with a disconnect order (block 740—YES), the open port may be designated as a recoverable port (block 745). For example, network auditing tool 470 may determine that the open port is recoverable and may instruct provisioning tool 440 to update provisioning database 410 to indicate that the open port is available.

If it is determined that the open port is not associated with a disconnect order (block 740—NO), a determination may be made as to whether there is another contingency associated with the open port (block 750). For example, network auditing tool 470 may check for other contingencies that may indicate that the port should remain unavailable, such as, for example, that the port is associated with an unpaid balance that has caused a temporary hold to be placed on a circuit associated with the port. Provisioning system 140 may, for example, receive an indication from a billing system to put a temporary hold on the circuit associated with the port.

In other examples, network auditing tool 470 may obtain information about another valid reason for why the port should remain unavailable, such as that a cable associated with the port is being repaired, that the customer has requested that the circuit associated with the port be temporarily deactivated, and/or any other valid reason for why the port should remain unavailable.

If it is determined that there is another contingency associated with the open port (block 750—YES), the open part may not be designated as a recoverable port (block 755). For example, network auditing tool 470 may not take any action to update the status of the open port in provisioning database 410. If it is determined that there is no other contingency associated with the open port (block 750—NO), the open port may be designated as a recoverable port (block 760). For example, network auditing tool 470 may determine that the open port is recoverable and may instruct provisioning tool 440 to update provisioning database 410 to indicate that the open port is available.

Figure 8:
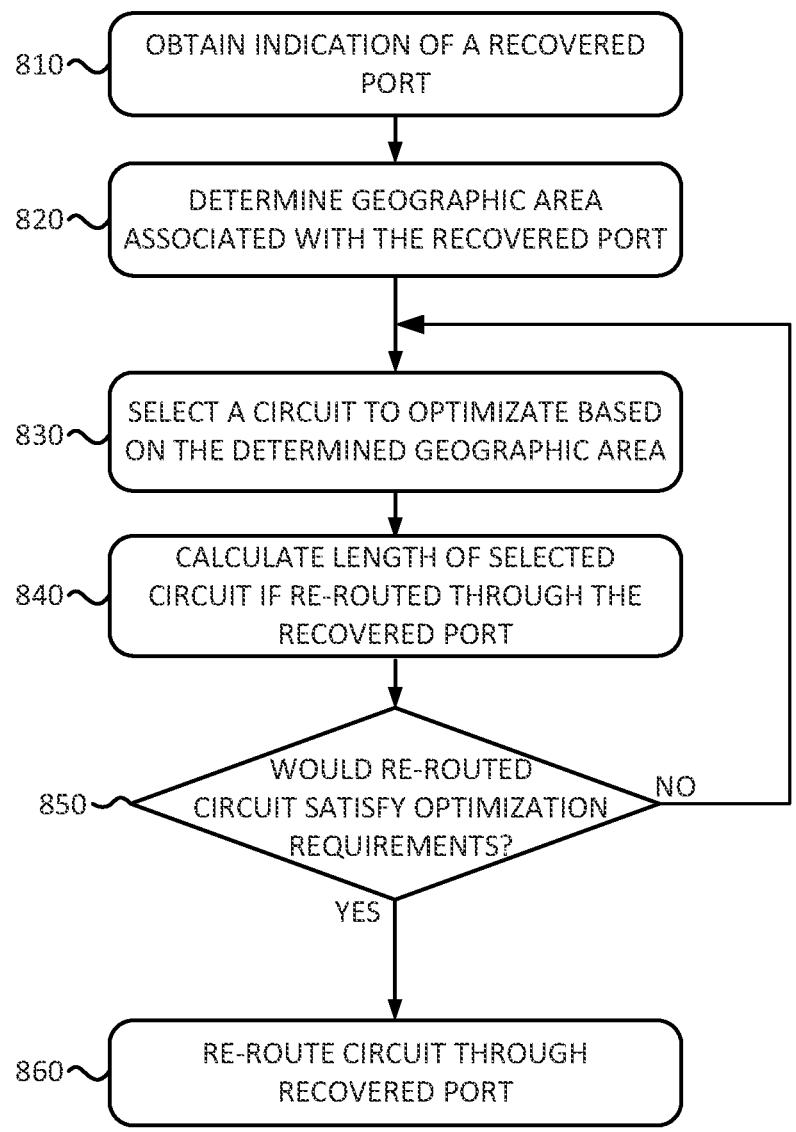
FIG. 8 is a flow chart of an exemplary process for performing optimization with respect to a recovered port according to an implementation described herein.

FIG. 8 is a flow chart of an exemplary process for performing optimization with respect to a recovered port according to an implementation described herein. In one implementation, the process of FIG. 8 may be performed by auditing system 150. In other implementations, some or all of the process of FIG. 8 may be performed by another device or a group of devices separate from auditing system 150 and/or including auditing system 150.

The process of FIG. 8 may include obtaining an indication of a recovered port (block 810). For example, optimization tool 480 may compare information stored in scanning database 450 with information stored in provisioning database 410 to identify that a particular port has been recovered. Based on identifying the recovered port, optimization tool 480 may initiate a process to determine whether an existing circuit could be optimized by re-routing the circuit through the recovered port.

A geographic area associated with the recovered port may be determined (block 820). For example, optimization tool 480 may access location field 520 of port record 500 associated with the recovered port to determine a geographic area associated with the recovered port. A circuit to optimize may be selected based on the determined geographic area (block 830). For example, optimization tool 480 may, by searching length fields 580 of circuit records 550, identify a circuit that has been tagged for optimization and that runs through the geographic area associated with the recovered port.

Optimization tool 480 may determine if the circuit runs through the geographic area by determining whether the geographic area lies between a beginning of the circuit and an end of the circuit. For example, optimization tool 480 may determine a location of a first port, associated with the circuit, may determine a location of a last port, associated with the circuit, and may determine whether a line from the location of the first port to the location of the last port is within a particular distance of the geographic area or overlaps part of the geographic area.

A length of the selected circuit, if re-routed through the recovered port, may be calculated (block 840). For example, optimization tool 480 may calculate what the actual length of the circuit would be if re-routed through the recovered port, by adding up the distances between DXCs 130 through which the circuit would be routed if re-routed through the recovered port.

A determination may be made as to whether the re-routed circuit would satisfy optimization requirements (block 850). For example, optimization tool 480 may compare the calculated actual length of the circuit, if re-routed through the recovered port, to a physical distance associated with the circuit, to determine whether a ratio of the calculated actual length to the physical distance is less than a particular threshold. Alternatively, optimization tool 480 may determine whether the calculated actual length of the circuit is less than a particular amount compared to a current actual length of the circuit. In another implementation, optimization may include determining whether the number of DXCs 130 within a circuit exceeds a threshold.

If it is determined that the re-routed circuit would not satisfy the optimization requirements (block 850—NO), processing may return to block 830 to select another circuit to optimize. If it is determined that the re-routed circuit would satisfy the optimization requirements (block 850—YES), the selected circuit may be re-routed through the recovered port (block 860). For example, optimization tool 480 may instruct provisioning tool 440 to re-route the selected circuit through the recovered port.

In another implementation, optimization tool 480 may perform blocks 830, 840, and 850 in connection with multiple circuits that have been tagged for optimization and may select the circuit that, if re-routed through the recovered port, would be associated with the largest improvement in a ratio of the actual length to the physical distance. In yet another implementation, optimization tool 480 may select a particular circuit to re-route through the recovered port using another technique. For example, optimization tool 480 may accept bids from customers for re-routing circuits associated with the customers and may select a circuit based on a highest received bid.

Figure 9:
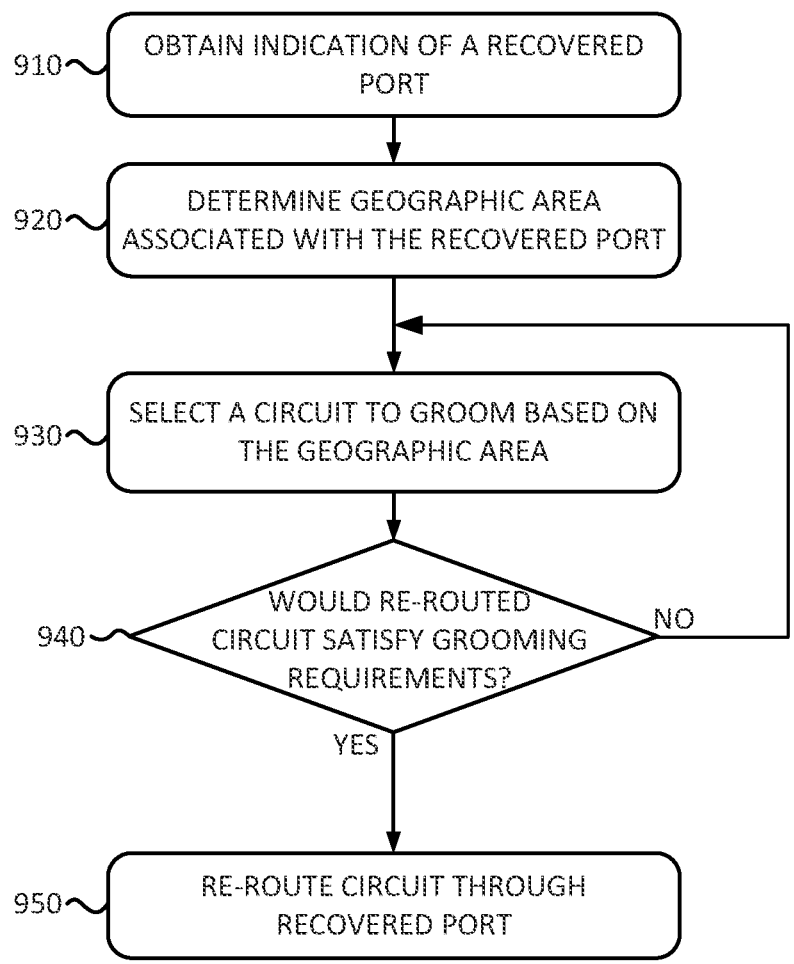
FIG. 9 is a flow chart of an exemplary process for performing grooming with respect to a recovered port according to an implementation described herein.

FIG. 9 is a flow chart of an exemplary process for performing grooming with respect to a recovered port according to an implementation described herein. In one implementation, the process of FIG. 9 may be performed by auditing system 150. In other implementations, some or all of the process of FIG. 9 may be performed by another device or a group of devices separate from auditing system 150 and/or including auditing system 150.

The process of FIG. 9 may include obtaining an indication of a recovered port that has been recovered (block 910).

For example, grooming tool 490 may compare information stored in scanning database 450 with information stored in provisioning database 410 to identify that a particular port has been recovered. Based on identifying the recovered port, grooming tool 490 may initiate a process to determine whether one or more circuits could be groomed using the identified recovered port.

A geographic area associated with the recovered port may be determined (block 920). For example, grooming tool 490 may access location field 520 of port record 500 associated with the recovered port to determine a geographic area associated with the recovered port. A circuit to groom may be selected based on the determined geographic area (block 930). For example, grooming tool 490 may select one or more circuits to groom based on the one or more circuits running through the geographic area and based on determining that resource use could be reduced by re-routing the one or more circuits through the recovered port. For example, the recovered port may correspond to a DS1 connection and grooming tool 490 may identify multiple DS0 circuits that could be combined into a DS1 connection that runs through the recovered port.

A determination may be made as to whether the re-routed circuit would satisfy grooming requirements (block 940). For example, grooming tool 490 may determine whether re-routing the selected one or more circuits through the recovered you would reduce resource use of network 120 by at least a particular amount (e.g., reduce the number of line terminating equipment devices that combine circuits of lesser bandwidth into a circuit of larger bandwidth).

If it is determined that the re-routed circuit would not satisfy the grooming requirements (block 940—NO), processing may return to block 930 to select another circuit to groom. If it is determined that the re-routed circuit would satisfy the grooming requirements (block 940—YES), the selected circuit may be re-routed through the recovered port (block 950). For example, grooming tool 490 may instruct provisioning tool 440 to re-route the selected circuit through the recovered port. In another implementation, grooming tool 490 may perform blocks 930, and 940 in connection with multiple sets of circuits and may select a set of circuits that would result in the greatest savings or use of resources.

Figure 10:
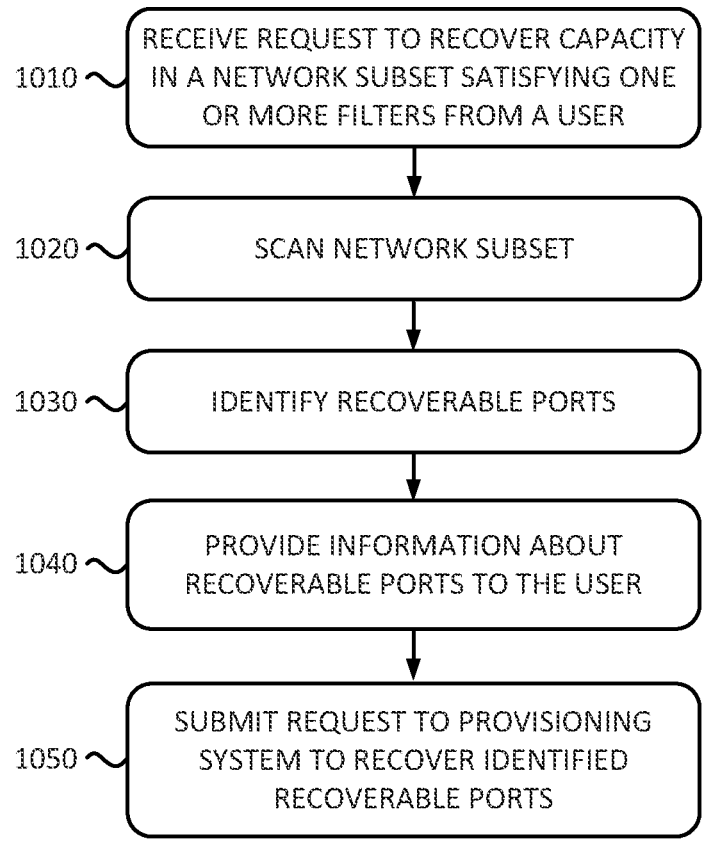
FIG. 10 is a flow chart of an exemplary process for scanning for orphaned ports based on demand according to an implementation described herein.

FIG. 10 is a flow chart of an exemplary process for scanning for orphaned ports based on demand according to an implementation described herein. In one implementation, the process of FIG. 10 may be performed by auditing system 150. In other implementations, some or all of the process of FIG. 10 may be performed by another device or a group of devices separate from auditing system 150 and/or including auditing system 150.

The process of FIG. 10 may include receiving a request to recover capacity in a network subset satisfying one or more filters from a user (block 1010). For example, auditing system 150 may provide a user interface to a customer that may allow the customer to scan circuits associated with the customer based on one or more filters. As an example, the customer may select to scan circuits associated with a particular geographic area or multiple geographic areas. As another example, the customer may select to scan for a particular type of circuit (e.g., DS1 circuits).

The network subset may be scanned (block 1020). For example, network scanning tool 460 may select circuits, associated with the customer, that satisfy the specified one or more filters, by accessing provisioning database 410 and may query ports associated with the selected circuits to determine whether the ports are open.

Recoverable ports may be identified (block 1030). For example, network auditing tool 470 may determine which of the identified open ports are recoverable (e.g., by executing the process of FIG. 7). Information about recoverable ports may be provided to the user (block 1040). For example, auditing system 150 may present information about the identified recoverable ports to the user via the user interface. A request may be submitted to a provisioning system to recover the identified recoverable ports (block 1050). For example, auditing system 150 may instruct provisioning tool 440 to update provisioning database 410 to recover the identified recoverable ports.

Figure 11:
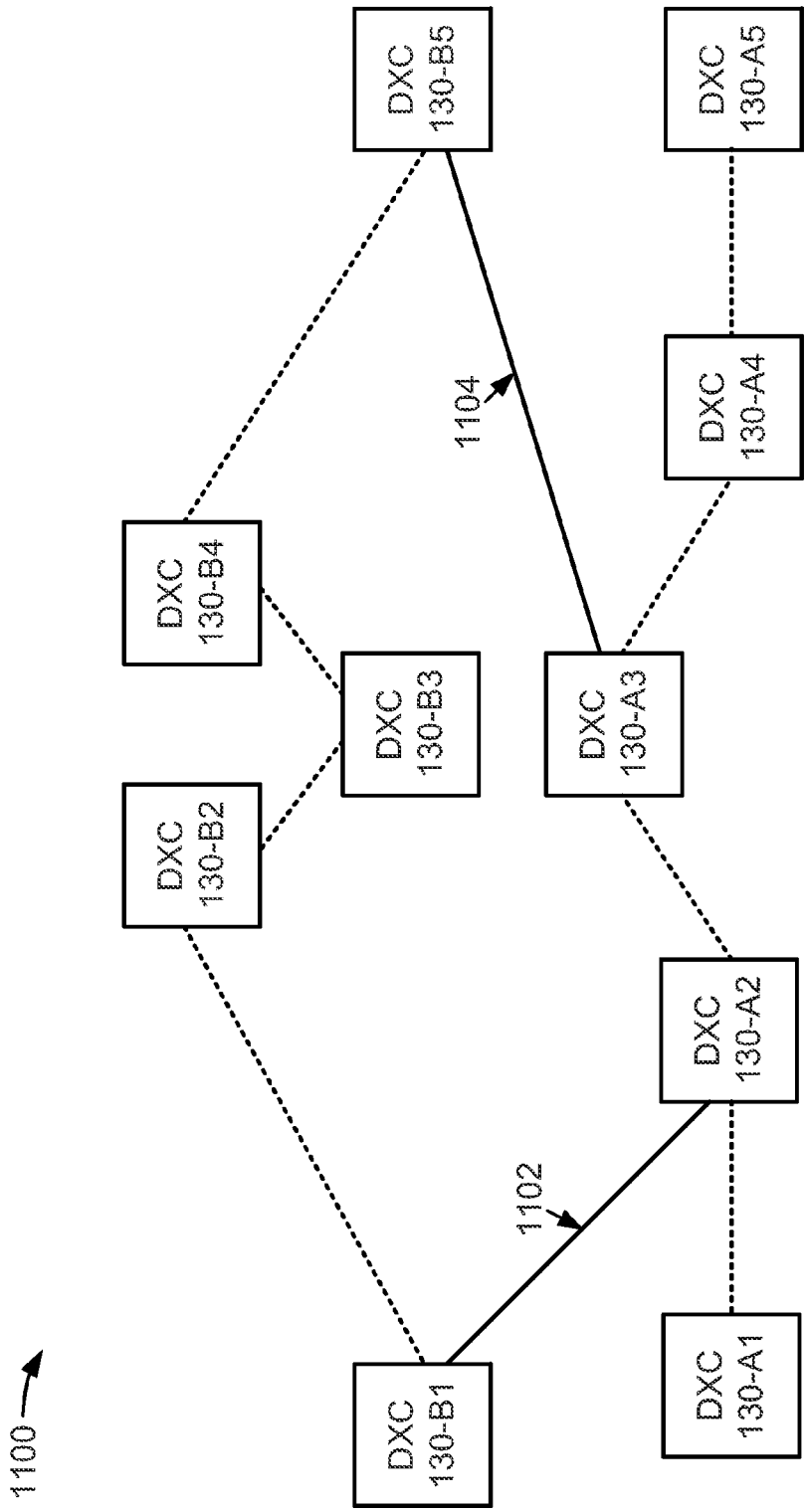
FIG. 11 is a diagram of a first example that illustrates an optimizing process that uses recovered ports.

FIG. 11 is a diagram of a first example 1100 that illustrates an optimization process that uses recovered ports. For example, assume a portion of network 120 includes the DXCs 130 of example 1100 with the connections (e.g., cables) as shown in FIG. 11. Further assume that a first circuit exists from DXC 130-A1 to DXC 130-A2, to DXC 130-A3, to DXC 130-A4, to DXC 130-A5 and that a second circuit exists from DXC 130-B1 to DXC 130-B2, to DXC 130-B3, to DXC 130-B4, to DXC 130-B5.

Assume the first circuit is disconnected at a customer's request, but provisioning database 410 is not updated to reflect the filet that the first circuit has been disconnected. At a later time, network scanning tool 460 may scan DXC 130-A2, may determine that the port associated with the connection from DXC 130-A1 to DXC 130-A2 is open, and may store information about the open port in scanning database 450. Network auditing tool 470 may subsequently determine that the port is designated as unavailable in provisioning database 410 and may further determine that a disconnect order has been received for the circuit associated with the port. Network auditing tool 470 may instruct provisioning tool 440 to designate the port as available. Network auditing tool 470 may further instruct provisioning tool 440 to designate other ports associated with the circuit as available. Thus, the following ports may be recovered: a port corresponding to a connection from DXC 130-A1 to DXC 130-A2, a port corresponding to a connection from DXC 130-A2 to DXC 130-A3, a port corresponding to a connection from DXC 130-A3 to DXC 130-A4, and a port corresponding to a connection from DXC 130-A4 to DXC 130-A5.

Furthermore, optimization tool 480 may, during an optimization process, access scanning database 450 and/or provisioning database 410. Assume that connections 1102 and 1104 are available. Optimization tool 480 may determine that the second circuit could be optimized by re-routing the second circuit through the port corresponding to a connection from DXC 130-A2 to DXC 130-A3, because the actual length of the second circuit would be decreased if the second circuit were so re-routed. Thus, the second circuit may be re-routed from DXC 130-B1 to DXC 130-A2, to DXC 130-A3, to DXC 130-B5.

Figure 12:
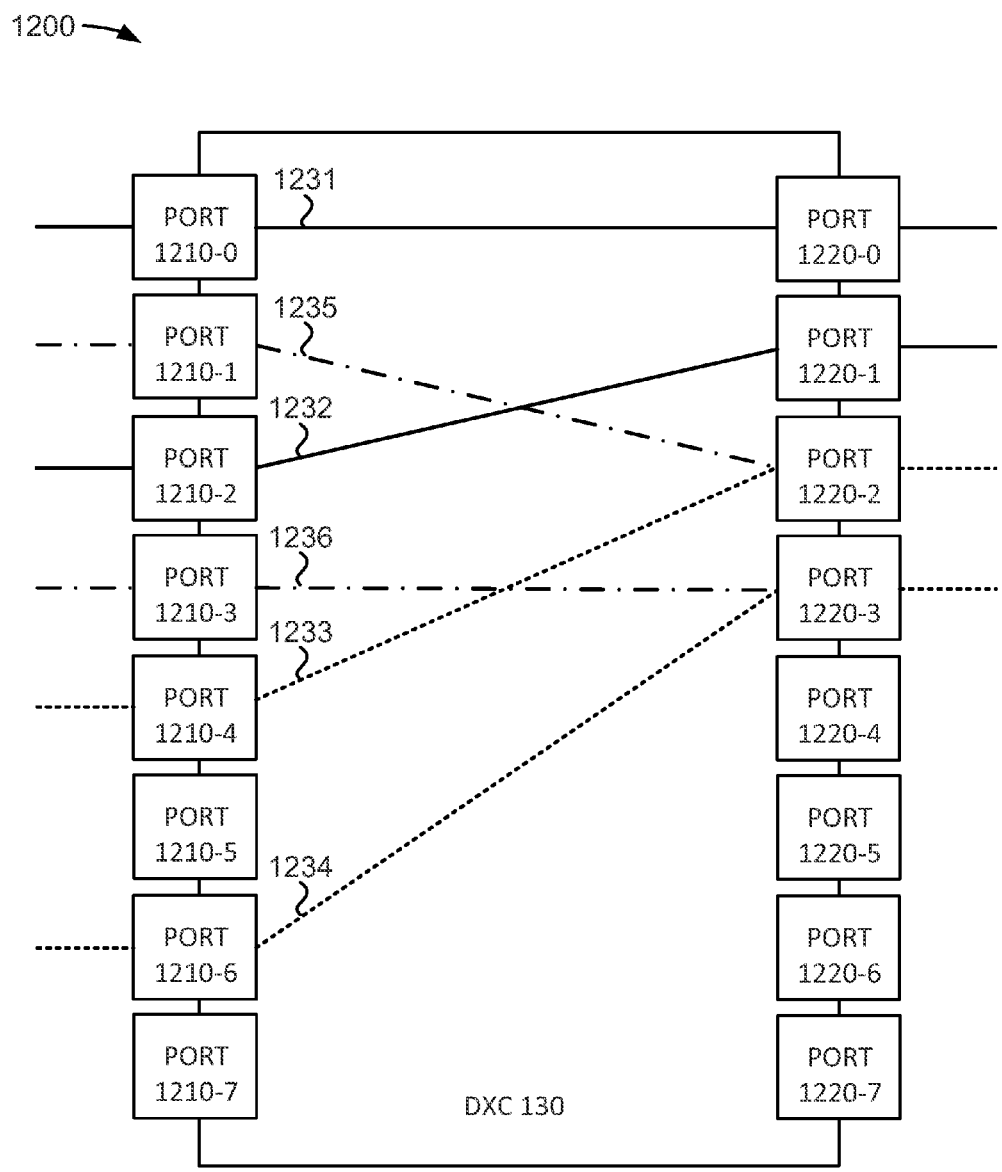
FIG. 12 is a diagram of a second example that illustrates a grooming process that uses recovered ports.

FIG. 12 is a diagram of a first example 1200 that illustrates a grooming process that uses recovered ports. Assume DXC 130 includes ports 1210-0 through 1210-7 and ports 1220-0 through 1220-7. Furthermore, assume that DCX 130 is associated with a first circuit 1231 that includes a connection from port 1210-0 to port 1220-0; a second circuit 1232 that includes a connection from port 1210-2 to port 1220-1; a third circuit 1233 that includes a connection from port 1210-4 to 1220-2; and a fourth circuit 1234 that includes a connection from port 1210-6 to port 1220-3. Moreover, assume that ports 1210-1 and 1210-3 are designated as unavailable in provisioning database 410.

Network scanning tool 460 may, during a subsequent scan of DXC 130, determine that ports 1210-1 and 1210-3 are available and may store the information about the availability of ports 1210-1 and 1210-3 in scanning database 450 (and may also instruct provisioning system 140 to recover ports 1201-1 and 1210-3). Furthermore, during a grooming process, grooming tool 490 may determine that it would be desirable to consolidate all circuits through DXC 130 to the first four ports 1210-0 through 1210-3. Grooming tool 490 may access scanning database 450 and determine that ports 1210-1 and 1210-3 are available. Consequently, grooming tool 490 may instruct DXC 130 to move third circuit 1233 from port 1210-4 to available port 1210-1 to create connection 1235 from port 1210-1 to 1220-2 and to move fourth circuit 1234 from port 1210-6 to available port 1210-3 to create connection 1236 from port 1210-3 to port 1220-3. Thus, grooming tool 490 may groom the circuits going through DXC 130 by consolidating the circuits to ports 1210-0 through 1210-3, thereby freeing up ports 1210-4 through 1210-7.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6-10, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also as used herein, the article "a" is intended to include one or more items. Further, the phrase "based on" is intended to mean "based, at least in part, on" unless explicitly stated otherwise.

What is claimed is:

1. A method performed by a computer device, the method comprising:
    scanning, by the computer device, a network of digital cross connect devices to identify an open port;
    storing, by the computer device, a port identifier associated with the identified open port in a scanning database;
    determining, by the computer device, that the identified open port has been designated as unavailable for provisioning in a provisioning database by comparing information stored in the scanning database with information stored in the provisioning database;
    determining, by the computer device, whether the unavailable identified open port corresponds to a recoverable port; and
    recovering, by the computer device, the unavailable identified open port by designating the identified open port as available for provisioning in the provisioning database, in response to determining that the identified open port corresponds to a recoverable port.

2. The method of claim 1, further comprising:
    identifying a circuit associated with the recovered identified open port;
    identifying another port associated with the identified circuit; and
    recovering the identified other port by designating the identified other port as available in the provisioning database.

3. The method of claim 2, further comprising:
    identifying all other ports associated with the identified circuit; and
    recovering the identified all other ports by designating the identified all other ports as available in the provisioning database.

4. The method of claim 1, wherein determining whether the unavailable identified open port corresponds to a recoverable port includes:
    determining that the unavailable identified open port is associated with an expired reservation in the provisioning database.

5. The method of claim 1, wherein determining that the unavailable identified open port corresponds to a recoverable port includes:
    determining that the unavailable identified open port is associated with a disconnect order in the provisioning database.

6. The method of claim 1, wherein determining that the unavailable identified open port corresponds to a recoverable port includes:
    determining that the unavailable identified open port is associated with an unpaid balance.

7. The method of claim 1, further comprising:
    selecting a circuit to optimize based on recovering the unavailable identified open port; and
    re-routing the selected circuit to include the recovered identified open port, wherein re-routing the selected circuit to include the recovered identified open port reduces a length associated with the selected circuit.

8. The method of claim 1, further comprising:
    selecting a circuit to groom based on recovering the unavailable identified open port; and
    grooming the selected circuit to include the recovered identified open port, wherein grooming the selected circuit to include the recovered identified open port results in reduced bandwidth use associated with the selected circuit.

9. The method of claim 1, further comprising:
    receiving a request to scan a subset of the network from a user, wherein the subset is defined by one or more filters;
    wherein scanning the network of digital cross connect devices to identify the open port includes:
        scanning the subset of the network to identify the open port; and
    wherein the method further comprises:
        providing information about the recovered identified open port to the user.

10. A system comprising:
    a computing device configured to:
        scan a network of digital cross connect devices to identify an open port;
        store a port identifier associated with the identified open port in a scanning database;
        determine that the identified open port has been designated as unavailable for provisioning in a provisioning database by comparing information stored in the scanning database with information stored in the provisioning database;
        determine whether the unavailable identified open port corresponds to a recoverable port; and
        recover the identified open port by designating the unavailable identified open port as available for provisioning in the provisioning database, in response to determining that the identified open port corresponds to a recoverable port.

11. The system of claim 10, wherein the unavailable identified open port is associated with at least one of a wide band digital cross connect device or a narrow band digital cross connect device.

12. The system of claim 10, wherein the computing device is further configured to:
   identify a circuit associated with the recovered identified open port;
   identify another port associated with the identified circuit; and
   instruct the provisioning database to recover the identified other port by designating the identified other port as available.

13. The system of claim 10, wherein, when determining that the unavailable identified open port corresponds to a recoverable port, the computing device is further configured to at least one of:
   determine that the unavailable identified open port is associated with an expired reservation in the provisioning database,
   determine that the unavailable identified open port is associated with a disconnect order in the provisioning database, or
   determine that the unavailable identified open port is associated with an unpaid balance.

14. The system of claim 10, wherein the computing device is further configured to:
   select a circuit to optimize based on recovering the unavailable identified open port; and
   re-route the selected circuit to include the recovered identified open port, wherein re-routing the selected circuit to include the recovered identified open port reduces a length associated with the selected circuit.

15. The system of claim 10, wherein the computing device is further configured to:
   select a circuit to groom based on recovering the unavailable identified open port; and
   groom the selected circuit to include the recovered identified open port, wherein grooming the selected circuit to include the recovered identified open port results in reduced bandwidth use by the selected circuit.

16. A non-transitory computer-readable medium storing instructions executable by one or more processors, the non-transitory computer-readable medium comprising:
   one or more instructions to scan a network of digital cross connect devices to identify an open port;
   one or more instructions to store a port identifier associated with the identified open port in a scanning database;
   one or more instructions to determine that the identified open port has been designated as unavailable for provisioning in a provisioning database by comparing information stored in the scanning database with information stored in the provisioning database;
   one or more instructions to determine whether the unavailable identified open port corresponds to a recoverable port; and
   one or more instructions to designate the unavailable identified open port as available for provisioning in the provisioning database, in response to determining that the unavailable identified open port corresponds to a recoverable port.

17. The non-transitory computer-readable medium of claim 16, further comprising:
   one or more instructions to select a circuit to optimize based on recovering the identified open port; and
   one or more instructions to re-route the selected circuit to include the recovered identified open port, wherein re-routing the selected circuit to include the recovered identified open port reduces a length associated with the selected circuit.

18. The non-transitory computer-readable medium of claim 16, further comprising:
   one or more instructions to select a circuit to modify based on recovering the identified open port; and
   one or more instructions to modify the selected circuit to include the recovered identified open port, wherein modifying the selected circuit to include the recovered identified open port results in reduced bandwidth use by the selected circuit.

\* \* \* \* \*